Patented Feb. 26, 1952

2,587,489

UNITED STATES PATENT OFFICE 2,587,489

PRODUCTION OF KETONES

Gennady M. Kosolapoff, Auburn, Ala., assignor to Monsanto Chemical Company, St. Louis, Mo., a corporation of Delaware No Drawing. Application December 14, 1950, Serial No. 200,880

7 Claims. (Cl. 260—592)

This invention relates to the production of aromatic alkoxy ketones by a novel method and more particularly to certain alkoxy ketones not obtainable by prior methods.

A present object is to provide a method to obtain alkoxy sustituted acetophenone derivatives useful in perfumery. In the case of the higher molecular weight compounds, the products may also be used as plasticizers. An object is also to prepare diacetyl derivatives of alkoxy-aryl compounds. Such products have not been generally obtainable by prior art methods such as the Friedel-Crafts reaction.

Another object of the invention is to prepare alkoxy substituted acetophenones which may be transformed into various vinyl compounds. Other objects will be apparent from the following description.

Acetophenone and its derivatives have been prepared by a number of methods, but the prior methods have been characterized by high costs, because of the numerous steps involved and the expensive catalysts necessary. Acetophenones have also been made by the Friedel-Crafts reaction, but the present invention dispenses with the use of the more expensive acid anhydrides and halides heretofore necessary; instead, the cheaper acids may be used directly to manufacture the monoacetyl derivatives. In addition, the poly-acetylated aromatic compounds, not obtainable by prior art methods, may now also be prepared.

I have now found that alkoxy substituted aromatic ketones may be prepared by the reaction of carboxylic acids with alkoxy substituted aromatic compounds in the presence of phosphorus pentoxide. The alkoxy radical may have from 1 to 18 carbon atoms and may be primary, secondary or tertiary in character. There may be one or more alkoxy groups up to 3 per aromatic ring.

Examples of suitable alkoxy substituted aromatic compounds are those compounds embraced by the formula:

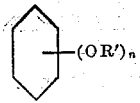

where R' is any alkyl group having from 1 to 18 carbon atoms, n is an integer having a value of one but not more than 3. The phenyl group in the above formula may be substituted or unsubstituted.

Suitable carboxylic acids may be any of the monobasic aliphatic carboxylic acids having more than 2 carbon atoms in the molecule, such, for example, as acetic, propionic, butyric, valeric, caproic, heptylic, caprylic, pelargonic, capric, lauric, myristic, palmitic, stearic, oleic, arachidic, behenic, lignoceric, cerotic, etc.

The general reaction appears to proceed as indicated by the equation:

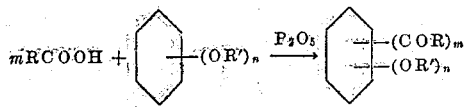

where m and n are integers having a value of from 1 to 3, R is an alkyl group and R' is also an alkyl group having from 1 to 18 carbon atoms.

When there is only one alkoxy substituent in the ring of the aromatic compound, the acyl substituent (—COR) generally enters the ring para to that group. When there are two alkoxy substituents in the ring in para-position to each other, or to other substituents, the acyl substituent enters at the 2- or 5-position. When there is substitution of two acyl substituents the substitution occurs mainly at the 2- and 5-position. Where there is substitution of more than one acyl substituent, a mixture of mono- and di-acyl substituted aromatic compounds is produced. This mixture can be resolved usually by careful fractional distillation.

The reaction herein disclosed may be considered as an acylation of alkoxy substituted aromatic compounds generally, whereby a nuclear hydrogen of the said aromatic compound is replaced with an acyl group, which comprises reacting the alkoxy substituted aromatic compound with a carboxylic acid in the presence of phosphorus pentoxide.

The invention is best carried out by mixing the ingredients in the proportions required for the production of the desired compound. The mixture is heated to accelerate the reaction. Conveniently it may be heated to the refluxing temperature of the acid-containing mixture. Refluxing may take place at ordinary atmospheric pressure. However, temperatures other than that provided for by atmosphere temperature refluxing may also be employed. The reactivity of the alkoxy aromatic body will vary directly with the number of alkoxy substituents present. Thus, a dialkoxy substituted aromatic compound is more reactive than a mono-alkoxy compound and a trialkoxy compound is more active than the dialkoxy derivative. Symmetrically disposed alkoxy substituents on the benzene ring are more reactive than unsymmetrical ones. Accordingly, the temperature to which the reaction mixture is heated should be varied depending upon the type of compound undergoing reaction and the time during which reaction is to be completed. In general, lower temperatures require longer times of reaction.

Since the $P_2O_5$ is required to be present in the reaction, it is desirable that it be intimately dispersed therein. Fortunately, $P_2O_5$ is obtainable as a finely-divided solid which, when dry, is readily dispersed by efficient stirring. However, water is liberated during the reaction or may be present in small quantities in the reactants which will combine with the $P_2O_5$ to form metaphosphoric acid. The phosphoric acid so formed is a sticky or gummy substance which is difficult to disperse itself and when present in substantial amounts will tend to occlude dry $P_2O_5$, making it more or less unavailable to the reactants. For this reason I prefer to have present a further dispersing agent which should be an inert material. For this purpose I may employ any inert solid or liquid. Solid dispersing agents which are useful for the present purpose are finely divided forms of silica, such as diatomaceous earth, finely ground quartz, finely divided silica gel, silica aerogel, etc. The amount of silica employed will depend upon the amount of water liberated and the amount of $P_2O_5$ present. In general, it is desired to utilize only sufficient $P_2O_5$ necessary to combine with the water liberated by the reaction so as to form metaphosphoric acid therewith. However, it is not always possible to completely react all of the $P_2O_5$ employed by reason of mechanical difficulties in dispersing this substance. However, by employing a finely divided inert material in conjunction with the $P_2O_5$ a better economy of $P_2O_5$ is realized.

My invention is further illustrated by means of the following examples:

Example 1

*Anisole.*—A charge of 108 g. (1.0 mole) anisole, 5 g. Celite and 71 g. of phosphorus pentoxide was stirred vigorously with gentle reflux and treated with 60 g. (1.0 mole) glacial acetic acid over a 35 minute period. After further stirring and refluxing for 10 minutes, the mixture was worked up to yield 15 g. methoxy acetophenone, B. P. 157–70°/30 mm., 30 g. diacetyl anisole and 70 g. of residual products.

The mono-acetyl fraction was redistilled through a fractionating column to yield pure para-methoxy acetophenone, B. P. 118–19°/3 mm., F. P. 32°. The chemical equation for this reaction is:

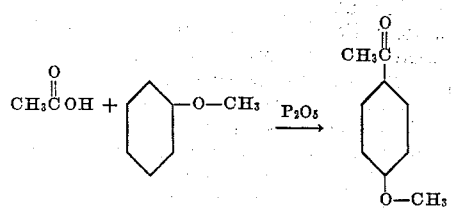

and

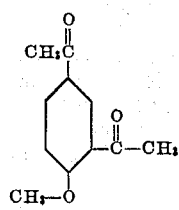

Example 2

*Phenetole.*—A run was made analogously to the run with anisole using 122 g. (1.0 mole) phenetole. There was obtained 50 g. ethoxy acetophenone, B. P. 100–5°/5 mm., and 35 g. diacetyl phenetole, B. P. 170–240°/5 mm.

Redistillation of the mono-ketone fraction gave pure para-ethoxy acetophenone, B. P. 131°/6 mm., 147°/16 mm., F. P. 35°, $n_D^{25}=1.5429$ (on super-cooled sample). The structure was confirmed by hypochlorite oxidation in 93% yield to para-ethoxy benzoic acid, M. P. 194.5–195.5° (from ethanol).

The diacetyl compound on recrystallization from alcohol formed shiny, pale yellow plates, M. P. 141.5–142°.

Example 3

244 g. phenetole, 60 g. acetic acid, 5 g. Celite and 71 g. $P_2O_5$ were reacted in 200 cc. benzene to yield 152 g. recovered phenetole, 95 g. para-ethoxy acetophenone (77% yield) and 20 g. higher acylation products.

This application is a continuation-in-part of my application Serial No. 679,559, filed June 26, 1946, now abandoned.

What I claim is:

1. A process for the acylation of alkoxy substituted aromatic compounds, whereby a nuclear hydrogen atom of the said aromatic compound is replaced with an acyl group, which comprises reacting said alkoxy substituted aromatic compounds with a carboxylic acid in the presence of phosphorus pentoxide.

2. A process for the acylation of an unsubstituted phenyl mono-alkyl ether whereby a nuclear hydrogen atom of the aromatic nucleus of said ether is replaced with an acyl group, which comprises reacting an unsubstituted phenyl mono-alkyl ether with a carboxylic acid in the presence of phosphorus pentoxide.

3. A process for acylating anisole comprising reacting the same with a carboxylic acid in the presence of phosphorus pentoxide.

4. A process for acylating phenetole comprising reacting the same with a carboxylic acid in the presence of phosphorus pentoxide.

5. A compound selected from the class consisting of diacetyl anisole and diacetyl phenetole.

6. Diacetyl anisole.

7. Diacetyl phenetole.

GENNADY M. KOSOLAPOFF.

REFERENCES CITED

The following references are of record in the file of this patent:

UNITED STATES PATENTS

| Number | Name | Date |
|---|---|---|
| 2,238,594 | Malishev | Apr. 15, 1941 |

FOREIGN PATENTS

| Number | Country | Date |
|---|---|---|
| 316,750 | Great Britain | Aug. 8, 1929 |

OTHER REFERENCES

Kinckell: Ber. 30, pages 1715–16 (1897).
Beilstein, vol. 8, page 293, 4th edition (1925).